US011597092B1

(12) United States Patent
Alspaugh et al.

(10) Patent No.: US 11,597,092 B1
(45) Date of Patent: Mar. 7, 2023

(54) END-OF-ARM TOOL WITH A LOAD CELL

(71) Applicant: Amazon Technologies, Inc., Seattle, WA (US)

(72) Inventors: David L. Alspaugh, Seattle, WA (US); Dipan M. Shah, Kenmore, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 16/831,041

(22) Filed: Mar. 26, 2020

(51) Int. Cl.
*B25J 13/08* (2006.01)
*B25J 9/16* (2006.01)
(Continued)

(52) U.S. Cl.
CPC .............. *B25J 9/1679* (2013.01); *B25J 9/06* (2013.01); *B25J 9/161* (2013.01); *B25J 9/1674* (2013.01);
(Continued)

(58) Field of Classification Search
CPC ... B25J 9/1679; B25J 9/06; B25J 9/161; B25J 9/1674; B25J 13/085; B25J 19/02; B25J 5/007; B25J 5/02
(Continued)

(56) References Cited

U.S. PATENT DOCUMENTS

| 5,454,533 A * | 10/1995 | Grant | B64F 5/20 901/43 |
|---|---|---|---|
| 6,374,982 B1 * | 4/2002 | Cohen | G01N 35/0099 901/17 |

(Continued)

FOREIGN PATENT DOCUMENTS

| DE | 102020125583 A1 | 3/2022 | |
|---|---|---|---|
| WO | WO-2020041819 A1 * | 3/2020 | ............ B25J 13/085 |
| WO | 2021231663 A2 | 11/2021 | |

OTHER PUBLICATIONS

Gonçalves, J. and P. Lima, "Grasp Planning with Incomplete Knowledge About the Object to be Grasped," 2019 IEEE International Conference on Autonomous Robot Systems and Competitions (ICARSC), 2019, pp. 1-6, doi: 10.1109/ICARSC.2019.8733615.

(Continued)

*Primary Examiner* — B M M Hannan
(74) *Attorney, Agent, or Firm* — Athorus, PLLC

(57) ABSTRACT

Systems and methods relating to an end-of-arm-tool that can be used in connection with the automated handling of vehicles, such as unmanned aerial vehicles (UAV), are disclosed. The described systems and methods can include an end-of-arm-tool which may include a load cell coupled to an end effector, such that forces and torques exerted on the end effector are translated onto the load cell. The measurement of forces and torques exerted on the end effector can facilitate determining various information in connection with the aerial vehicle, such as inertial properties or parameters associated with the aerial vehicle, the quality of the engagement between the end effector and the aerial vehicle, as well as diagnostic information in connection with the aerial vehicle. Additionally, the use of a load cell to measure forces and torques exerted on the end effector can eliminate the need to utilize traditional contact sensors typically required on the contact surfaces of an end-of-arm tool.

18 Claims, 13 Drawing Sheets

(51) Int. Cl.
*B25J 19/02* (2006.01)
*B25J 9/06* (2006.01)
*B25J 5/02* (2006.01)
*B25J 5/00* (2006.01)

(52) U.S. Cl.
CPC ............. *B25J 13/085* (2013.01); *B25J 19/02* (2013.01); *B25J 5/007* (2013.01); *B25J 5/02* (2013.01)

(58) Field of Classification Search
USPC ........................................................ 700/260
See application file for complete search history.

(56) References Cited

U.S. PATENT DOCUMENTS

| | | | | |
|---|---|---|---|---|
| 7,373,844 | B1* | 5/2008 | Chen | G01L 3/1478 73/862.541 |
| 9,108,805 | B2 | 8/2015 | Thomas | |
| 9,452,528 | B1 | 9/2016 | Checka et al. | |
| 9,687,982 | B1* | 6/2017 | Jules | B25J 9/1612 |
| 9,718,195 | B1* | 8/2017 | Youmans | B25J 15/0213 |
| 10,166,676 | B1* | 1/2019 | Hudson | B25J 9/1612 |
| 10,279,480 | B1* | 5/2019 | Holson | G01C 9/00 |
| 10,406,685 | B1* | 9/2019 | Wilson | B25J 15/08 |
| 11,014,234 | B2* | 5/2021 | Toshimitsu | B25J 9/1633 |
| 11,091,256 | B2* | 8/2021 | Cappelleri | B64C 39/024 |
| 11,154,985 | B1* | 10/2021 | Strauss | G05B 19/425 |
| 11,235,890 | B1* | 2/2022 | Dahlstrom | B64D 47/08 |
| 2006/0249623 | A1* | 11/2006 | Steele | B64F 1/04 244/116 |
| 2007/0032923 | A1* | 2/2007 | Mossman | G05D 1/0858 701/4 |
| 2009/0108605 | A1* | 4/2009 | Becker | B25J 15/0226 901/31 |
| 2009/0294584 | A1* | 12/2009 | Lovell | B64C 39/024 901/30 |
| 2010/0280661 | A1 | 11/2010 | Abdallah et al. | |
| 2013/0082137 | A1* | 4/2013 | Gundlach | B64C 39/024 244/110 G |
| 2016/0144510 | A1* | 5/2016 | Gulhar | A61B 8/4218 901/4 |
| 2017/0057081 | A1* | 3/2017 | Krohne | B25J 9/08 |
| 2017/0109465 | A1 | 4/2017 | Wang et al. | |
| 2017/0277167 | A1 | 9/2017 | Noda et al. | |
| 2018/0071874 | A1* | 3/2018 | Bergeron | B25J 13/04 |
| 2018/0217249 | A1* | 8/2018 | La Salla | G01S 13/867 |
| 2018/0265295 | A1* | 9/2018 | Beckman | B61D 17/16 |
| 2018/0265296 | A1* | 9/2018 | Beckman | G06Q 10/083 |
| 2018/0286119 | A1 | 10/2018 | Leon et al. | |
| 2018/0345487 | A1* | 12/2018 | Sandhu | B25J 9/1612 |
| 2019/0152055 | A1 | 5/2019 | Abe | |
| 2019/0283251 | A1* | 9/2019 | Nakamoto | B25J 9/1607 |
| 2019/0321971 | A1* | 10/2019 | Bosworth | B25J 9/1065 |
| 2019/0322384 | A1* | 10/2019 | Bosworth | G05D 1/101 |
| 2020/0016756 | A1* | 1/2020 | Rus | B25J 9/1689 |
| 2020/0024853 | A1* | 1/2020 | Furrer | B25J 19/021 |
| 2020/0027326 | A1* | 1/2020 | Ravat | F41H 13/0087 |
| 2020/0055195 | A1* | 2/2020 | Ignakov | B25J 13/06 |
| 2020/0070354 | A1 | 3/2020 | Nakayama et al. | |
| 2020/0361634 | A1* | 11/2020 | Gil | G06T 7/001 |
| 2021/0023711 | A1* | 1/2021 | Lee | B25J 9/1697 |
| 2021/0122039 | A1* | 4/2021 | Su | B25J 9/1612 |
| 2021/0122056 | A1* | 4/2021 | Menon | B25J 19/023 |
| 2021/0125052 | A1 | 4/2021 | Tremblay et al. | |
| 2021/0214163 | A1 | 7/2021 | Deacon et al. | |
| 2021/0269149 | A1* | 9/2021 | Culver | B64C 39/024 |
| 2021/0323171 | A1* | 10/2021 | Pivac | B25J 13/085 |
| 2021/0362334 | A1 | 11/2021 | Yamane | |
| 2021/0387336 | A1 | 12/2021 | Fukusen | |
| 2022/0226995 | A1 | 7/2022 | Beck et al. | |

OTHER PUBLICATIONS

Gualtieri, M., A. t. Pas and R. Platt, "Pick and Place Without Geometric Object Models," 2018 IEEE International Conference on Robotics and Automation (ICRA), 2018, pp. 7433-7440, doi: 10.1109/ICRA.2018.8460553.

Janse Van Vuuren, J., L. Tang, I. Al-Bahadly and K. M. Arif, "A 3-Stage Machine Learning-Based Novel Object Grasping Methodology," in IEEE Access, vol. 8, pp. 74216-74236, 2020, doi: 10.1109/ACCESS.2020.2987341.

Paletta, L., Fritz, G., Kintzler, F., Irran, J., and Dorffner, G. (2007). "Perception and Developmental Learning of Affordances in Autonomous Robots," In Annual Conference on Artificial Intelligence (Cambridge: Springer), 235-250. doi: 10.1007/978-3-540-74565-5_ 19 (Year: 2007).

Viña, F. E., Bekiroglu, Y., Smith, C., Karayiannidis, Y., Kragic, D. (2013). Predicting Slippage and Learning Manipulation Affordances Through Gaussian Process Regression. In 2013 13th IEEE-RAS International Conference on Humanoid Robots (Humanoids) (pp. 462-468). (Year: 2013).

Vohra, M., R. Prakash and L. Behera, "Real-time Grasp Pose Estimation for Novel Objects in Densely Cluttered Environment," 2019 28th IEEE International Conference on Robot and Human Interactive Communication (RO-MAN), 2019, pp. 1-6, doi: 10.1109/RO-MAN46459.2019.8956438.

\* cited by examiner

END-OF-ARM TOOL WITH A LOAD CELL

BACKGROUND

Aerial vehicles typically require handling that is meticulous and precise. However, manual handling of aerial vehicles can be difficult, time consuming, and can often lead to damage of the aerial vehicle. For example, various components such as pitot tubes and wings can be damaged, calibrated sensors can be inadvertently moved thereby requiring recalibration, connectors can become dislodged, etc. Further, the aerial vehicles can be unknowingly subjected to forces and torques that may compromise the structural integrity of the aerial vehicle.

DETAILED DESCRIPTION

Figure 1A:
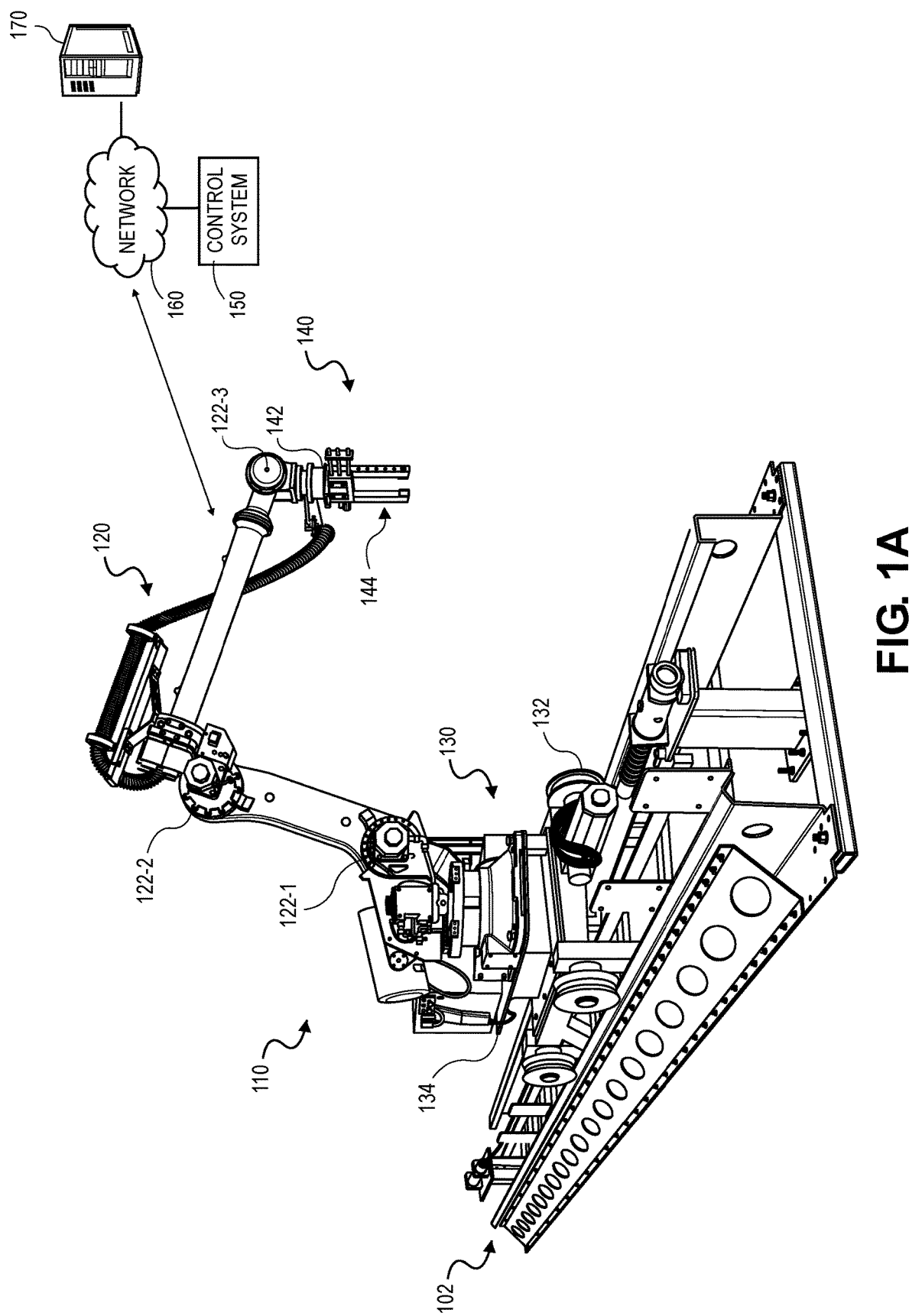
FIGS. 1A and 1B are illustrations of an exemplary robot, in accordance with embodiments of the present disclosure.

As is set forth in greater detail below, embodiments of the present disclosure are generally directed to systems and methods for an end-of-arm-tool that can be used in connection with the automated ground handling of aerial vehicles such as unmanned aerial vehicles (UAV). Embodiments of the present disclosure can provide an end-of-arm tool which may include a load cell coupled to an end effector, such that forces and torques exerted on the end effector are translated onto the load cell. The end effector can be configured to engage a contact point of an aerial vehicle, and the load cell can measure forces and torques exerted on the end effector. The measurement of forces and torques exerted on the end effector can facilitate determining various information in connection with the aerial vehicle, such as inertial properties or parameters associated with the aerial vehicle, the quality of the engagement between the end effector and the aerial vehicle, limits on manipulation, transportation and handling of the vehicle, as well as diagnostic information in connection with the aerial vehicle. Utilizing a load cell to measure forces and torques exerted on the end effector eliminates the need to utilize traditional contact sensors typically required on the contact surfaces of an end-of-arm tool. Such traditional contact sensors can be sensitive to dirt, dust, moisture, temperature, grease, water, vibrations in the object to be engaged, etc. Additionally, traditional contact sensors typically require visual and/or audio feedback to register the instant of contact and also introduce design constraints on the shape of the tool that is engaging the object, as well as the contact point of the object with which it is engaging. Utilizing a load cell that can measure the forces and torques exerted on the end effector can avoid these limitations and shortcomings of traditional contact sensors.

As described herein, embodiments of the present disclosure can provide an engagement tool, e.g., for use with a robotic apparatus such as a robotic arm, that can include an end effector and a load cell that can measure forces and torques exerted on the end effector. The end effector can be coupled to an end of a robotic arm or a robot and can include engagement members that can facilitate automated engagement with a vehicle such as an unmanned aerial vehicle. For example, the engagement members can be received by and/or mate with a contact point of an aerial vehicle to engage an aerial vehicle at the contact point of the aerial vehicle and can enable manipulation of the aerial vehicle by the robot to facilitate handling of the aerial vehicle (e.g., ground handling, etc.). Preferably, the load cell is rigidly coupled to the end effector and can measure forces and torques exerted on the end effector in at least six degrees of freedom of motion (e.g., translation along the X-axis, Y-axis, and Z-axis and rotation about the X-axis, Y-axis, and Z-axis). According to certain aspects of the present disclosure, the load cell can be disposed at the wrist joint of the robotic arm, adjacent to the end effector.

The forces and torques can be measured, for example, as the end effector is engaging the aerial vehicle. The forces and torques can begin to be measured as the end effector first makes contact with the aerial vehicle as the end effector is engaging the aerial vehicle. For example, the forces and torques measured as the end effector is engaging the vehicle can indicate whether the alignment of the end effector is correct to ensure proper engagement of the aerial vehicle, whether the aerial vehicle is resting stably on the surface from which it is being engaged (e.g., an unstable pose of the aerial vehicle can be the result of a damaged landing gear, etc.), etc. Further, the forces and torques can also be measured as the robot is manipulating, moving, orienting, handling, placing (e.g., on the ground or on a ground handling cart, etc.), etc. the aerial vehicle. Accordingly, the engagement tool can monitor the forces and torques exerted on the vehicle being handled to ensure that the vehicle is being handled and/or manipulated such that the forces exerted on the vehicle are less than the force and torque limits that the vehicle should experience while being handled. Additionally, the forces and torques exerted on the end effected by an engaged aerial vehicle can also be measured as the robot moves and manipulates the aerial vehicle through a predetermined sequence or protocol of movements and/or exercises to make specific measurements (e.g., inertial or vehicle parameters) and/or assessments. For example, the robot can rotate an engaged aerial vehicle about the x-axis a certain angle (e.g., 5 degrees, 10 degrees, 15 degrees, 45 degrees, 90 degrees, 180 degrees, 360 degrees, etc.), then rotate the aerial vehicle about the y-axis a certain angle (e.g., 5 degrees, 10 degrees, 15 degrees, 45 degrees, 90 degrees, 180 degrees, 360 degrees, etc.), and then rotate the aerial vehicle about the z-axis a certain angle (e.g., 5 degrees, 10 degrees, 15 degrees, 45 degrees, 90 degrees, 180 degrees, 360 degrees, etc.). Alternatively and/or in addition, the robot can translate the aerial vehicle along the x-axis a certain distance (e.g., ±1 meter, ±2 meters, ±5 meters, etc.), then translate the aerial vehicle along the y-axis a certain distance (e.g., ±1 meter, ±2 meters, ±5 meters, etc.), and then translate the aerial vehicle long the z-axis a certain distance (e.g., ±1 meter, ±2 meters, ±5 meters, etc.). Other movements and procedures can also be utilized depending on the type of information that is to be determined.

The force and torque measurements enabled by the load cell can be used to determine various information regarding the aerial vehicle and the quality of the engagement between the end effector and the aerial vehicle. For example, the measurement of the forces and torques exerted on the end effector by the aerial vehicle can facilitate determining inertial properties or parameters associated with the aerial vehicle, such as mass, weight, moment of inertia, center of gravity, vibration response, etc. Additionally, these measurements can be used to provide an assessment of the engagement of the end effector with the aerial vehicle (e.g., quality of engagement, alignment of the engagement, incorrect or improper engagement, etc.), as well as an assessment of the aerial vehicle itself or its payload (e.g., whether a payload was delivered, whether the payload shifted during transport, whether the aerial vehicle suffered a collision, whether an inertial property has changed, etc.).

Although embodiments of the present disclosure are described primarily with respect to aerial vehicles, embodiments of the present disclosure can be applicable to other any other types of vehicles that can benefit from automated handling thereof, such as, for example, unmanned aerial vehicles, ground based vehicles, autonomous ground based vehicles, water based vehicles, unmanned water based vehicles, etc. Further, although embodiments of the present disclosure are described primarily with respect to a load cell disposed at a wrist of a robotic arm, embodiments of the present disclosure also contemplate employing one or more additional load cells disposed at various positions along the robotic arm. Moreover, other force and torque sensors/detectors can also be employed in place of or in conjunction with the load cells described herein.

Figure 1B:
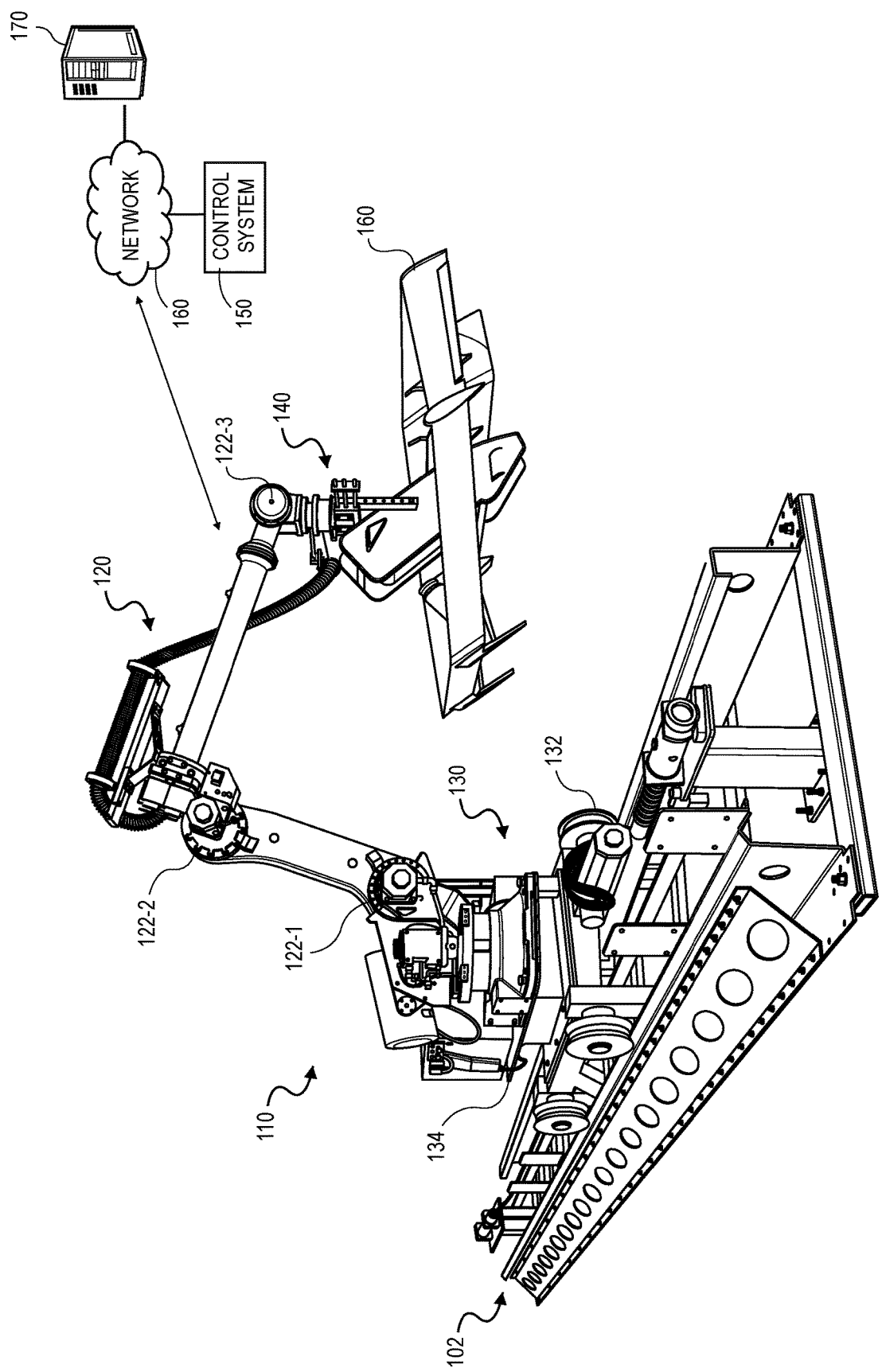

FIGS. 1A and 1B are illustrations of an exemplary robot 110 having an end-of-arm tool 140, in accordance with embodiments of the present disclosure. According to certain embodiments of the present disclosure, robot 110 can be used in the automated handling of an aerial vehicle. FIG. 1A shows robot 110 with end-of-arm tool 140 not engaged with an aerial vehicle while FIG. 1B shows robot 110 with end-of-arm tool 140 engaged with aerial vehicle 160. As shown in FIGS. 1A and 1B, robot 110 can include carriage portion 130 and robotic arm 120. Robotic arm 120 can include end-of-arm tool 140 and a plurality of articulating pivots 122. Pivots 122 can provide for multiple degrees of freedom of movement (e.g., six degrees of freedom of movement—translation along the X-axis, Y-axis, and Z-axis and rotation about the X-axis, Y-axis, and Z-axis). Robot 110 can also include carriage portion 130, which can include base 134 and wheels 132. Base 134 can support robotic arm 120, while wheels 132 can engage track 102 on which robot 110 may operate.

Robot 110 can also employ a multitude of various sensors to facilitate autonomous operation. For example, robot 110 can include proximity sensors, imaging sensors (e.g., cameras), speed sensors, force and torque detectors, laser sensors (e.g., LIDAR), thermal sensors, radar, thermal sensors, accelerometers, gyroscopes, radio-frequency identification (RFID) sensors, etc. to facilitate autonomous operation of robot 110. For example, aerial vehicles may land, or be oriented in various different poses, and the multitude of sensors can facilitate detection of the pose of the aerial vehicle and the location of the contact point(s) on the aerial vehicle to allow robotic arm 120 to safely and securely engage the aerial vehicle without damaging the aerial vehicle.

Further, robot 110 can communicate with control system 150 (or other computer system such as computing system 170) via network 160. For example, network 160 can include any wired or wireless network (e.g., cellular, satellite, Bluetooth, Wi-Fi, etc.) such as a local area network, wide area network, etc. that can facilitate communications between robot 110 and control system 150, as well as other computing systems such as computing system 170. Robot 110 and control system 150 can transmit data and other information, including one or more instructions and/or commands, via network 160. Control system 150 is discussed in further detail below with respect to FIG. 10, which can control the operation, engagement of vehicles, routing, navigation, communication, etc. of robot 110. According to certain aspects of the present disclosure, robot 110 can include a direct link (e.g., via network 160, or other network) to a safety system in the facility in which robot 110 may be operating. For example, if robot 110 were to detect a fault or other condition, it could transmit an alert directly to the safety system of the facility so that any such condition could receive prompt attention.

As shown in FIGS. 1A and 1B, end-of-arm tool 140 can be disposed at one end of robotic arm 120 and can engage (and disengage) an aerial vehicle. To grasp and engage an aerial vehicle, end-of-arm tool can include load cell 142 and end effector 144. End effector 144 can be configured to be received by and/or mate with a contact point of the aerial vehicle with which it is engaging. Further, load cell 142 can be coupled to end effector 144, such that forces and torques exerted on end effector 144 can be measured by load cell 142. Load cell 142 can include any load cell (e.g., electric, hydraulic, pneumatic, strain-gauge, piezoresistive, inductive, etc.), or any other type of force sensor or detector. Preferably, load cell 142 is rigidly coupled to end effector 144 at a wrist joint of robotic arm 120 to decrease loss such that load cell 142 can accurately measure the forces and torques exerted on end effector 144. Alternatively, load cell 142 can be positioned at any point along robotic arm 142 (e.g., adjacent to any pivots 122 or any point in between). According to certain aspects, multiple load cells 142 can be employed and positioned at various positions along robotic arm 120 and end-of-arm tool 140, and the forces and torques measured by the multiple load cells can be aggregated and combined in determining the overall forces and torques exerted on end effector 144.

According to embodiments of the present disclosure, load cell 142 can measure the forces and torques exerted on end effector 144 by an aerial vehicle engaged with end effector 144. Preferably, load cell 142 can measure forces and torques exerted on end effector 144 in six degrees of freedom of movement. For example, load cell 142 can also measure the forces and torques exerted on end effector 144 as end effector 144 is engaging an aerial vehicle. The measurements obtained with the initial engagement of the aerial vehicle can provide information such as, for example, whether the alignment of end effector 144 is correct to ensure proper engagement of the aerial vehicle, whether the aerial vehicle is resting stably on the surface from which it is being engaged (e.g., an unstable pose of the aerial vehicle can be the result of a damaged landing gear, etc.), whether a payload associated with the aerial vehicle was delivered, etc. Further, the forces and torques can also be measured while robot 110 is handling, moving, and/or manipulating an aerial vehicle engaged with end effector 144, placing an aerial vehicle back on the ground, etc. This can allow, for example, robot 110 to determine whether the engaged aerial vehicle is being handled and/or manipulated such that the forces exerted on the vehicle are less than the force and torque limits that the vehicle should experience while being handled, moved, and/or manipulated. Additionally, defined protocols and/or predetermined sequences of movement/manipulation of an engaged aerial vehicle can be established to obtain specific force and torque measurements associated with the aerial vehicle to determine inertial parameters associated with the aerial vehicle (e.g., mass, weight, center of gravity, moment of inertia, vibration response, etc.) and/or perform diagnostics and/or assessments of the aerial vehicle. According to one implementation, after engaging an aerial vehicle, the aerial vehicle can be rotated about the x-axis a certain angle (e.g., 5 degrees, 10 degrees, 15 degrees, 45 degrees, 90 degrees, 180 degrees, 360 degrees, etc.), then rotated about the y-axis a certain angle (e.g., 5 degrees, 10 degrees, 15 degrees, 45 degrees, 90 degrees, 180 degrees, 360 degrees, etc.), and then rotated about the z-axis a certain angle (e.g., 5 degrees, 10 degrees, 15 degrees, 45 degrees, 90 degrees, 180 degrees, 360 degrees, etc.). Alternatively and/or in addition, the aerial vehicle can be translated along the x-axis a certain distance (e.g., ±1 meter, ±2 meters, ±5 meters, etc.), then translated along the y-axis a certain distance (e.g., ±1 meter, ±2 meters, ±5 meters, etc.), and then translated along the z-axis a certain distance (e.g., ±1 meter, ±2 meters, ±5 meters, etc.). An engaged aerial vehicle can also be vibrated such that load cell 142 can also measure a vibration response of the aerial vehicle. Other movements and procedures can also be utilized depending on the type of information that is to be determined.

These forces and torques exerted on end effector 144 and measured by load cell 142 can be used to determine various information regarding the aerial vehicle and the quality of the engagement between end effector 144 and the aerial vehicle. For example, the measurement of the forces and torques exerted on the end effector by the aerial vehicle can facilitate determining inertial properties or parameters associated with the aerial vehicle (e.g., as mass, weight, moment of inertia, center of gravity, etc.). Additionally, these measurements can be used to provide an assessment of the engagement of end effector 144 with the aerial vehicle (e.g., quality of engagement, alignment of the engagement, incorrect or improper engagement, etc.), as well as an assessment of the aerial vehicle itself and/or a payload associated with the aerial vehicle (e.g., whether a payload was delivered, whether a payload shifted during transport, whether the aerial vehicle suffered a collision, whether an inertial property has changed, the vibration response of the aerial vehicle, etc.). Since the measurement of these forces and torques exerted on the end effector 144 can be used to determine the engagement of end effector 144 with a vehicle, contact sensors typically are unnecessary. Accordingly, end effector 144 preferably does not include any contact sensors (e.g., on the "fingers," etc.) that may be used to determine the quality of an engagement of the vehicle.

Figure 2A:
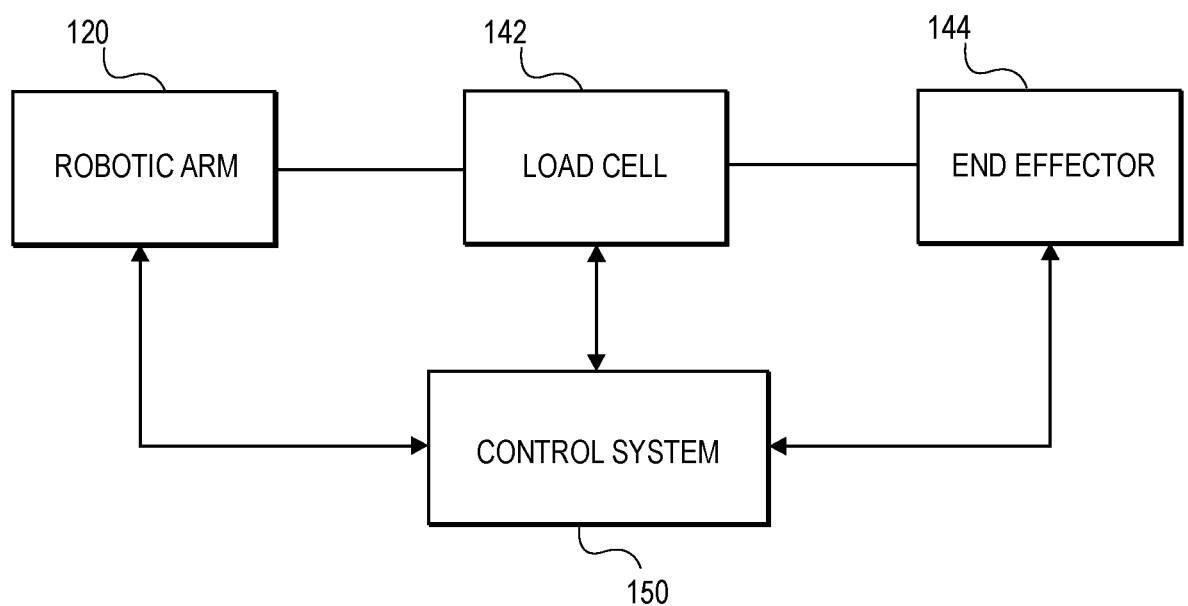
FIG. 2A is a block diagram of an exemplary end-of-arm tool, in accordance with embodiments of the present disclosure.

FIG. 2A is a block diagram showing an exemplary configuration of robotic arm 120, load cell 142, end effector 144 and control system 150 according to embodiments of the present disclosure. As shown in FIG. 2A, load cell 142 and end effector 144 can be coupled to robotic arm 120. Further, control system 150 can be in communication with robotic arm 120, load cell 142, and end effector 144. Control system 150 can transmit and receive data and other information, including one or more instructions and/or commands, to and from robotic arm 120, load cell 142, and end effector 144.

Figure 2B:
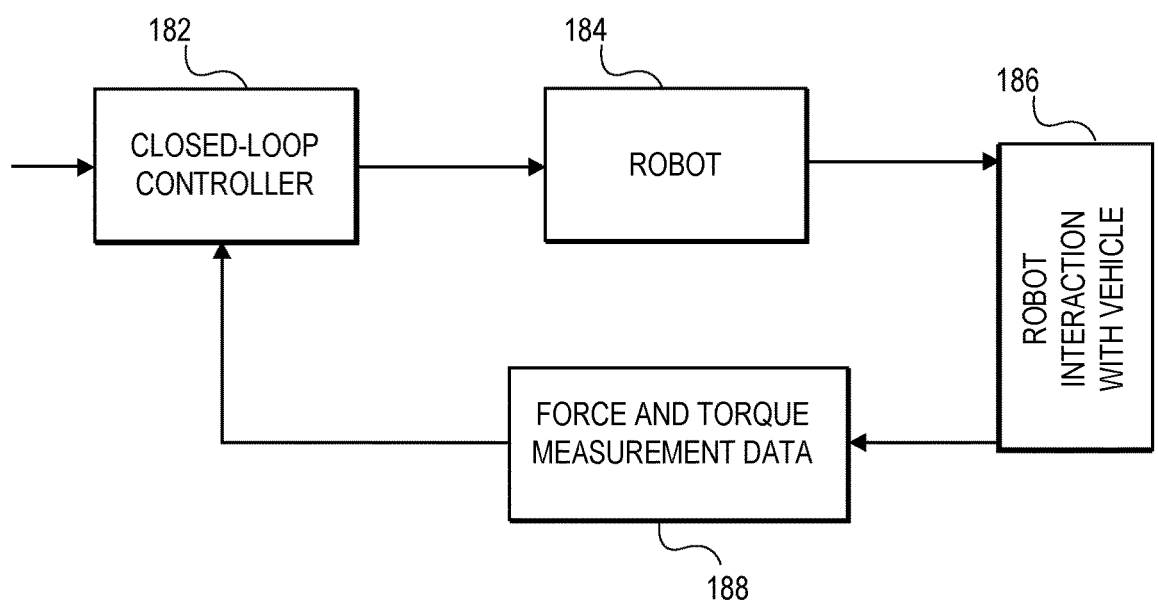
FIG. 2B is a block diagram of an exemplary control loop, in accordance with embodiments of the present disclosure.

FIG. 2B is a block diagram showing an exemplary control loop 180 according to embodiments of the present disclosure. For example, control loop 180 may illustrate the control loop of robot 110 as it is interacting with a vehicle via end effector 144 and load cell 142. As shown in FIG. 2B, closed-loop controller 182 can provide certain instructions and data to robot 184 (e.g., robot 110). These instructions and data can include, for example, the commands the robot is it perform in connection with a vehicle it may engage or has already engaged (e.g., engagement, manipulation, testing, transporting, placing, etc.), expected and/or ideal force and torque measurements, etc. As shown in FIG. 2B, these instructions and data can be provided to robot 184, which can then interact with the vehicle, as in 186, in accordance with the instructions and data provided by controller 182. Further, force and torque measurement data 188 can be provided (e.g., as a feedback loop) to closed-loop controller 182 to ensure that the measured forces and torques are within specified parameters or thresholds. Accordingly, if any of the measured forces and torques exceed the expected parameters, the robot's interaction with the vehicle can be ceased.

Figure 3A:
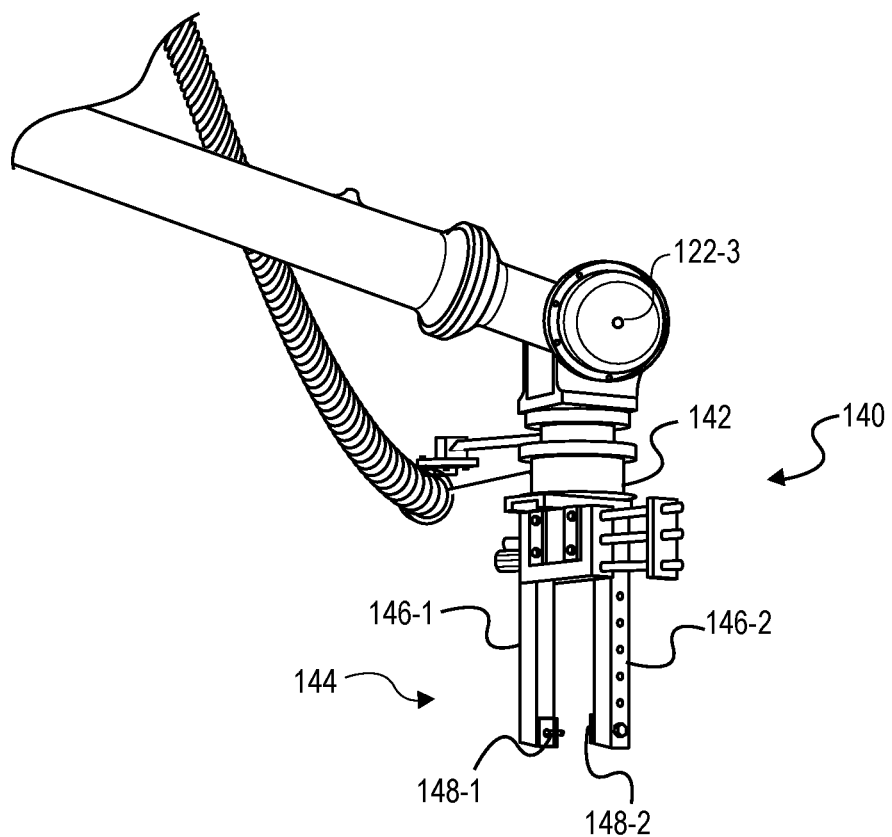
FIGS. 3A and 3B are illustrations of an exemplary end-of-arm tool, in accordance with embodiments of the present disclosure.
Figure 3B:
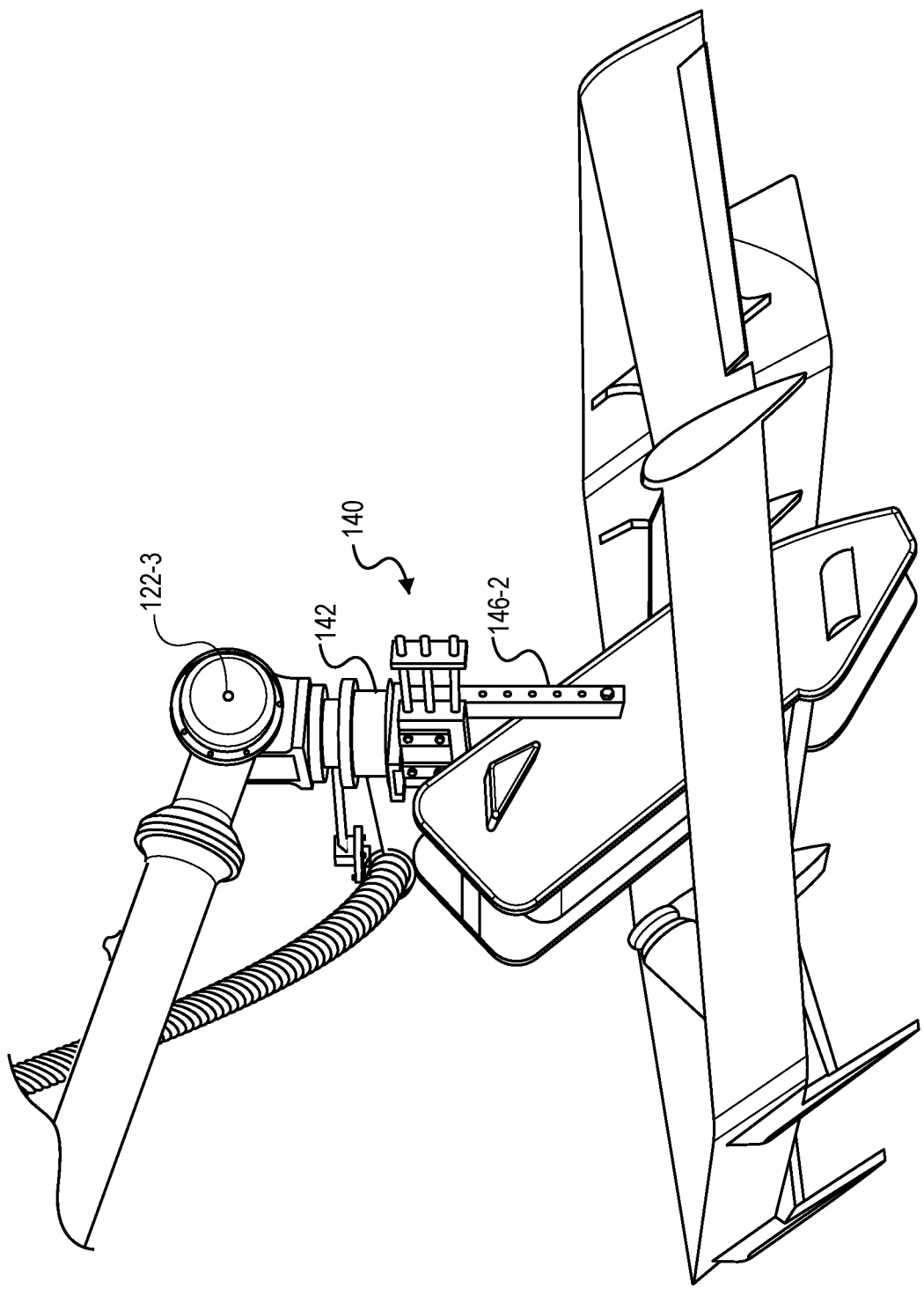

FIGS. 3A and 3B show closeup views of end-of-arm tool 140, which can include load cell 142 and end effector 144. FIG. 3A shows end-of-arm tool 140 not engaged with an aerial vehicle while FIG. 3B shows end-of-arm tool 140 engaged with an aerial vehicle. As shown in FIGS. 3A and 3B, load cell 142 is rigidly coupled to end effector 144 at the wrist joint of robot arm 120, and end effector 144 can include arms 146-1 and 146-2 and engagement members 148-1 and 148-2. To engage an aerial vehicle, engagement members 148-1 and 148-2 can be received by and mate with a contact point on the aerial vehicle, and arms 146-1 and 146-2 can articulate between open and closed positions to securely engage the aerial vehicle. According to certain aspects of the present disclosure, one of arms 146-1 and 146-2 may remain fixed and the other of arms 146-1 and 146-2 may move such that arms 146-1 and 146-2 are articulated between the open and closed positions. Alternatively, both arms 146-1 and 146-2 may move such that arms 146-1 and 146-2 are articulated between the open and closed positions. The movement of one or both of arms 146-1 and 146-2 can be performed via motors (e.g., servomotor, stepper motor, etc.), actuators (e.g., linear, rotary, etc.), pneumatics, worm screw arrangement, hydraulics, linkages, gears, belts, or various other configurations or arrangements to cause the relative movement of arms 146-1 and 146-2 between the open and closed positions.

As arms 146-1 and 146-2 are articulated from an open position to a closed position to engage an aerial vehicle, engagement members 148-1 and 148-2 can engage a contact point of the aerial vehicle. According to certain aspects, the contact point on the aerial vehicle can include an opening, cavity, or recess, and engagement members 148-1 and 148-2 can include protrusions or bars that are received in the opening, recess, or cavity. According to certain aspects, engagement members 148-1 and 148-2 can include keyed protrusions and the contact point on the vehicle can include an opening or cavity with a shape that is complementary to engagement members 148-1 and 148-2, so as to facilitate secure engagement of engagement members 148-1 and 148-2 with the contact point of the aerial vehicle. Alternatively, engagement members 148-1 and 148-2 can include features that are biased so that they expand once they are received in and engaged with the contact point of the aerial vehicle. For example, engagement members 148-1 and 148-2 can include a resilient deformable material that expands within the contact point of the aerial vehicle, or engagement members 148-1 and 148-2 can include spring biased elements that are biased in a radial direction to expand when engagement members 148-1 and 148-2 are received in and engaged with the contact point of the aerial vehicle. Optionally, end effector 144 can measure a closing force applied in engaging with and gripping an aerial vehicle.

Figure 4:
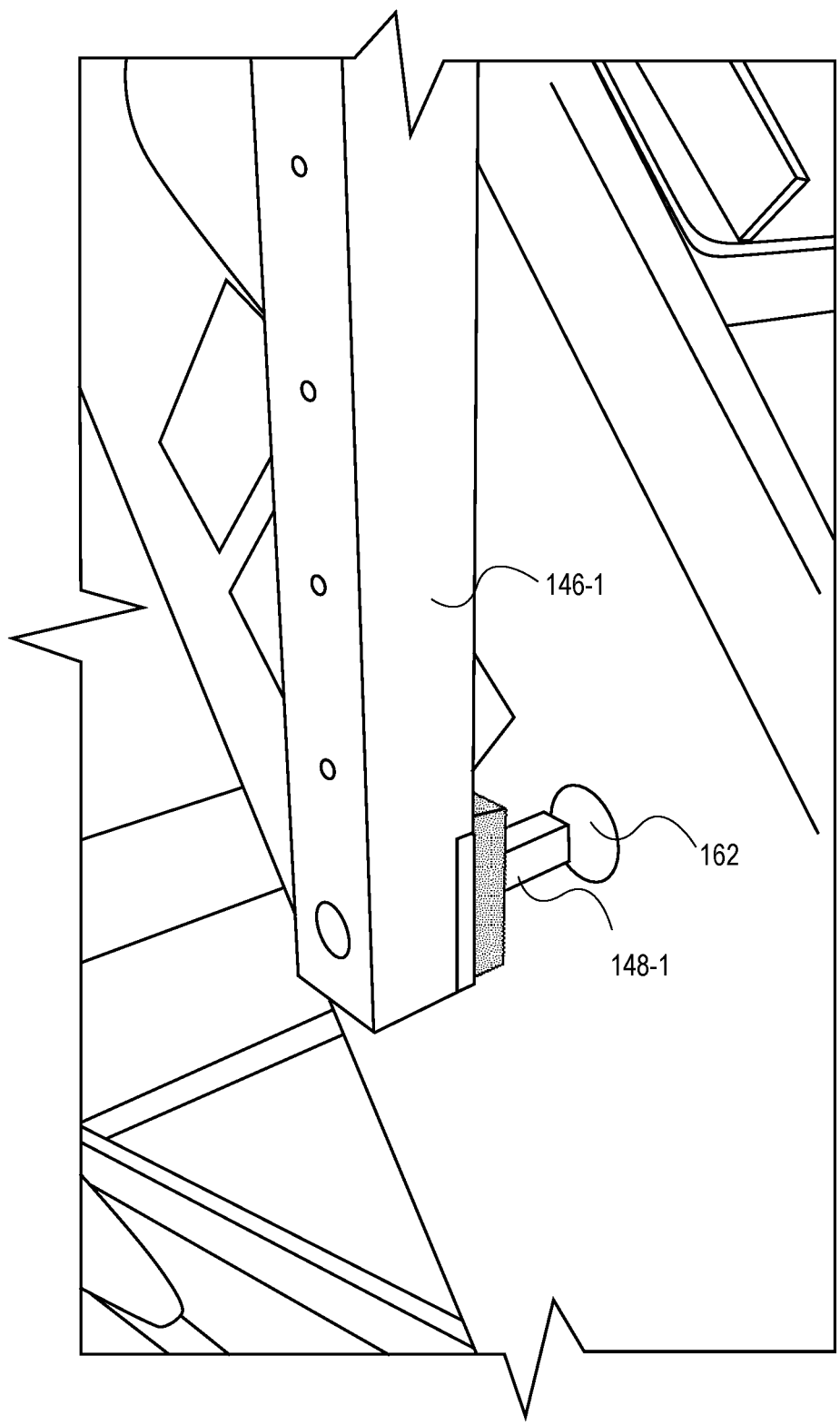
FIG. 4 is an illustration of an exemplary engagement apparatus, in accordance with embodiments of the present disclosure

FIG. 4 shows a closeup view of end effector 144 where arms 146-1 and 146-2 are in an open position and engagement members 148-1 and 148-2 are not engaged with contact point 162 of an aerial vehicle. As shown in FIG. 4, arms 146-1 and 146-2 are in an open position, and contact point 162 includes an opening, cavity, or recess, with which engagement member 148-1 and 148-2 can engage. According to certain embodiments, robot 110 can include proximity sensors and/or laser ranging sensors to determine the position and pose of the aerial vehicle relative to end effector 144. Based on the determination of the position and pose of the aerial vehicle, end effector 144 can be oriented such that engagement members 148-1 and 148-2 are aligned with contact point 162 in preparation for engagement with contact point 162. According to certain embodiments, the proximity sensors and/or ranging sensors can be disposed on end effector 144. Once the initial alignment is determined, arms 146-1 and 146-2 can be articulated from the open position to the closed to position such that engagement members 148-1 and 148-2 begin their engagement with contact point 162. As engagement members 148-1 and 148-2 contact an aerial vehicle adjacent to contact point 162, the contact of engagement members 148-1 and 148-2 with the aerial vehicle may exert forces and torques on engagement members 148-1 and 148-2 (and thereby, on end effector 144), which can be measured by load cell 142. The magnitude and direction of the forces and torques exerted on end effector 144 can facilitate a determination of whether engagement members 148-1 and 148-2 are properly engaging contact point 162 of the aerial vehicle. For example, the forces and torques exerted on end effector 144 in situations of correct alignment and engagement may be substantially lower than the forces and torques exerted on end effector 144 in circumstances where the alignment and engagement of engagement members 148-1 and 148-2 with contact point 162 is improper. Accordingly, since the alignment and/or quality of the engagement can be determined by the forces and torques exerted on end effector 144 and measured by load cell 142, end effector 144 preferably does not include any contact sensors that can be used to determine the quality of an engagement of the vehicle with end effector 144. For example, arms 146-1 and 146-2 and engagement members 148-1 and 148-2 preferably do not include contact sensors disposed thereon.

Although end effector 144 is shown with arms 146-1 and 146-2 and engagement members 148-1 and 148-2, end effector 144 can include any component, mechanism, and/or structure that can facilitate engagement with a target object. For example, end effector 144 can include a suction mechanism, a hook mechanism, etc., or any other type of mechanism that can facilitate engagement with a target object, such as an aerial vehicle.

Additionally, other manipulations and handling of the aerial vehicle (e.g., where robot 110 is maintaining the aerial vehicle in a fixed position, where robot 110 is manipulating the aerial vehicle through an established protocol of sequenced movements, etc.) may have predetermined expected force and torque values. Forces and torques measured by load cell 142 that deviate from the respective expected values by more than an acceptable tolerance range may indicate a fault condition with the aerial vehicle and/or the engagement of end effector 144 with the aerial vehicle. Additionally, certain protocols of sequenced movements can be established to specifically determine certain inertial properties or parameters associated with the aerial vehicle (e.g., weight, mass, moment of inertia, center of gravity, etc.) and/or diagnose or troubleshoot potential fault conditions associated with the aerial vehicle.

Figure 5:
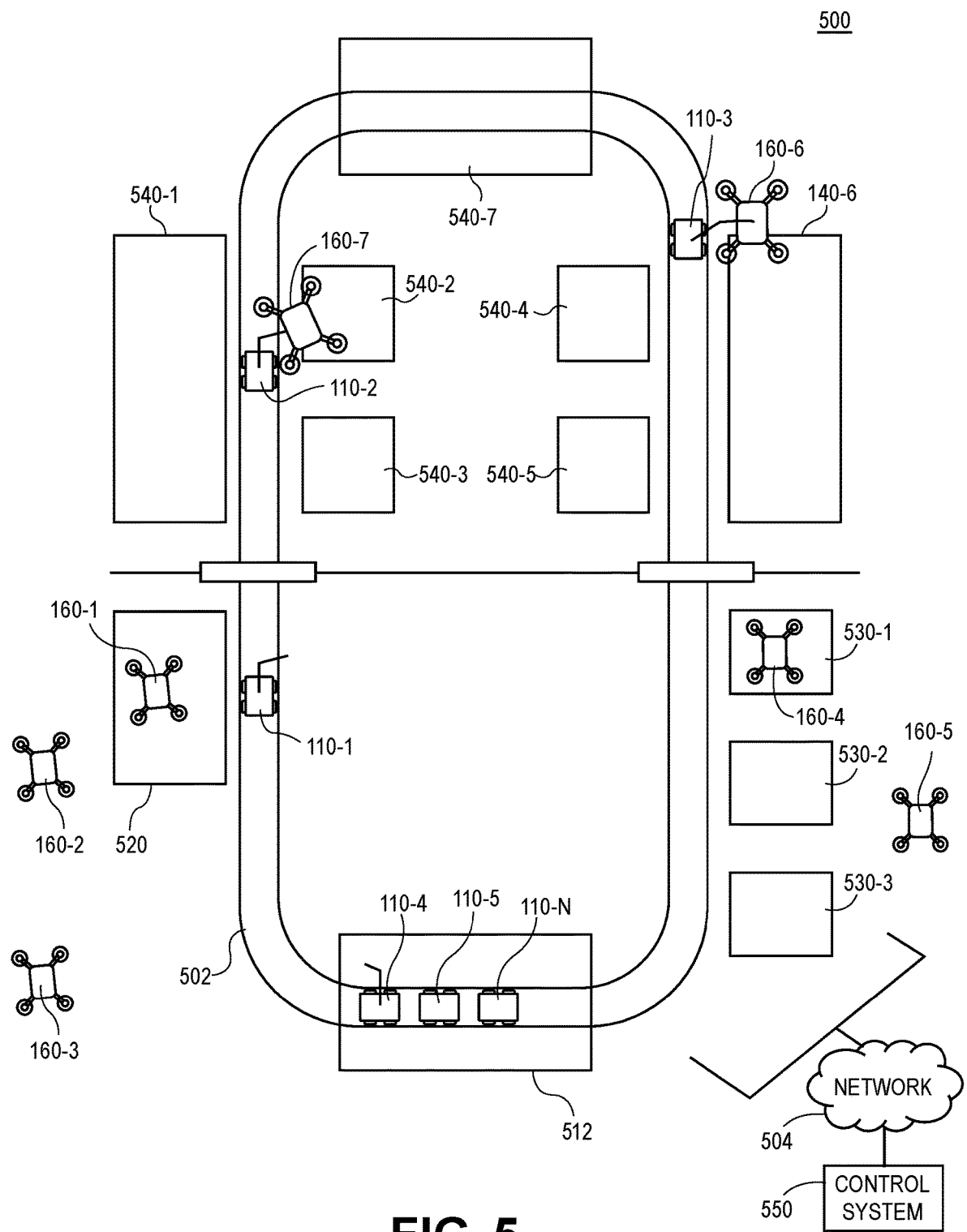
FIG. 5 is a block diagram of an exemplary automated ground handling system for aerial vehicles, in accordance with embodiments of the present disclosure.

FIG. 5 is a block diagram of an exemplary automated aerial vehicle ground handling system 500 that may employ robot 110 to facilitate ground handling of aerial vehicles. For example, automated aerial vehicle ground handling system 500 can employ robot 110, which can include end-of-arm tool 140, to provide ground handling of aerial vehicles at any facility. As shown in FIG. 5, aerial vehicle 160-1 may have landed, aerial vehicles 160-2 and 160-3 may be performing approaches for landing, aerial vehicles 160-6 and 160-7 may be undergoing the ground handling process, aerial vehicle 160-4 may have completed the ground handling process and is preparing for takeoff, and aerial vehicle 160-5 may have completed the ground handling process and has taken off.

As shown in FIG. 5, automated aerial vehicle ground handling system 500 can include continuous track 502, robots 110, robot queuing area 512, landing area 520, takeoff areas 530, aerial vehicle handling stations 540, and control system 550. FIG. 5 also shows aerial vehicles 160 that are being processed by automated aerial vehicle ground handling system 500. As shown in FIG. 5, aerial vehicle handling stations 540 can be disposed along continuous track 502 such that robots 110 can transport aerial vehicles 160 to one or more of aerial vehicle handling stations 540 for ground handling. Robots 110 and aerial vehicles 160 may be in communication with control system 550 through network 504.

In operation, as aerial vehicle 160-1 is making an approach to land (or after it has landed), automated aerial vehicle ground handling system 500 can determine that aerial vehicle 160-1 is performing a landing and robot 110-1 can be dispatched (e.g., from robot queuing area 512) to landing area 520 to engage aerial vehicle 160-1. Alternatively, robot 110-1 can be dispatched to engage another aerial vehicle 160 at any one of aerial vehicle handling stations 540. Once aerial vehicle 160-1 is identified, a vehicle type of aerial vehicle 160-1 can be determined and certain sensor information can be received from aerial vehicle 160-1. This allows a ground handling workflow associated with aerial vehicle 160-1 to be determined. The workflow can include a sequential order indicating how ground handling of aerial vehicle 160-1 is to be performed.

After robot 110-1 has engaged aerial vehicle 160-1 and the workflow associated with aerial vehicle 160-1 has been determined, robot 110-1 can transport aerial vehicle 160-1 to the various aerial vehicle handling stations 540 in accordance with the workflow. According to embodiments of the present disclosure, while robot 110-1 is engaged with aerial vehicle 160-1 and performing the ground handling operations associated with aerial vehicle 160-1, another aerial vehicle 160-2 may be performing an approach for landing. Similarly, another robot (e.g., 110-4) can be dispatched from robot queuing area 512 to landing area 520 to engage aerial vehicle 160-2 to perform ground handling operations associated with aerial vehicle 160-2, while aerial vehicle 160-1 is still undergoing ground handling operations.

Figure 6:
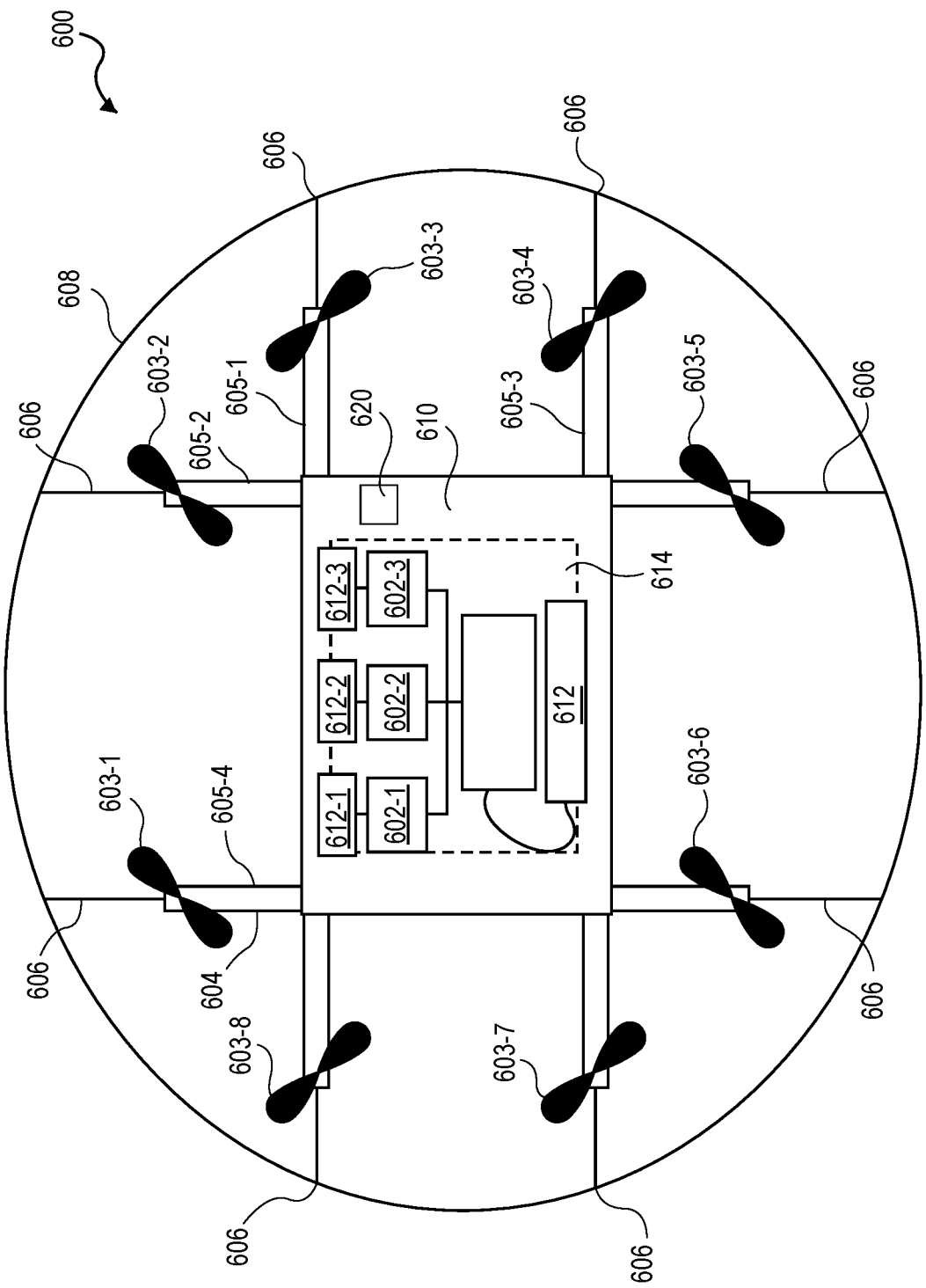
FIG. 6 is a block diagram of an exemplary aerial vehicle, in accordance with embodiments of the present disclosure.

FIG. 6 is an illustration of an exemplary aerial vehicle 600 that may be engaged by end effector 144 and have ground handling processing performed by automated aerial vehicle ground handling system 500, in accordance with embodiments of the present disclosure. As illustrated, the aerial vehicle 600 can include eight propellers 603-1, 603-2, 603-3, 603-4, 603-5, 603-6, 603-7, 603-8 spaced about the frame 604 of the aerial vehicle. The propellers 603 may be any form of propeller (e.g., graphite, carbon fiber) and of a size sufficient to lift the aerial vehicle 600 and any inventory engaged by the aerial vehicle 600 so that the aerial vehicle 600 can navigate through the air to deliver the item(s) to a delivery location. While this example includes eight propellers, in other implementations, more or fewer propellers may be utilized. Likewise, in some implementations, the propellers may be positioned at different locations on the aerial vehicle 600. In addition, alternative methods of propulsion may be utilized as "motors" in implementations described herein. For example, fans, jets, turbojets, turbo fans, jet engines, internal combustion engines, and the like may be used (either with propellers or other devices) to propel the aerial vehicle.

The frame 604 of the aerial vehicle 600 may likewise be of any suitable material, such as graphite, carbon fiber and/or aluminum. In this example, the frame 604 of the aerial vehicle 600 includes four rigid members 605-1, 605-2, 605-3, 605-4, or beams arranged in a hash pattern with the rigid members intersecting and joined at approximately perpendicular angles. In this example, rigid members 605-1 and 605-3 are arranged substantially parallel to one another and are approximately the same length. Rigid members 605-2 and 605-4 are arranged substantially parallel to one another, yet perpendicular to rigid members 605-1 and 605-3. Rigid members 605-2 and 605-4 are approximately the same length. In some embodiments, all of the rigid members 605 may be of approximately the same length, while in other implementations, some or all of the rigid members may be of different lengths. Likewise, the spacing and/or orientation between the two sets of rigid members may be approximately the same or different. Frame 604 can also include grasping point 620, at which end effector 144 of robot 110 can engage. For example, grasping point 620 can include a reinforced section that includes an element, such as a recess, a hole, an opening, etc. that can receive and/or mate with engagement members 148-1 and 148-2 of robot 110. Grasping point 620 can be reinforced and structured and designed to prevent damage to aerial vehicle 600 as aerial vehicle 600 is engaged, transported, and manipulated by robot 110.

While the implementation illustrated in FIG. 6 includes four rigid members 605 that are joined to form the frame 604, in other implementations, there may be fewer or more components to the frame 604. For example, rather than four rigid members, in other implementations, the frame 604 of the aerial vehicle 600 may be configured to include six rigid members. In such an example, two of the rigid members 605-2, 605-4 may be positioned parallel to one another. Rigid members 605-1, 605-3 and two additional rigid members on either side of rigid members 605-1, 605-3 may all be positioned parallel to one another and perpendicular to rigid members 605-5, 605-4. With additional rigid members, additional cavities with rigid members on all four sides may be formed by the frame 604. As discussed further below, a cavity within the frame 604 may be configured to include an inventory engagement mechanism for the engagement, transport and delivery of item(s) and/or containers that contain item(s).

In some implementations, the aerial vehicle may be configured to reduce aerodynamic resistance. For example, an aerodynamic housing may be included on the aerial vehicle that encloses the aerial vehicle control system 610, one or more of the rigid members 605, the frame 604 and/or other components of the aerial vehicle 600. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism 614 may be configured such that when the inventory is engaged it is enclosed within the frame and/or housing of the aerial vehicle 600 so that no additional drag is created during transport of the inventory by the aerial vehicle 600. In other implementations, the inventory may be shaped to reduce drag and provide a more aerodynamic design of the aerial vehicle and the inventory. For example, if the inventory is a container and a portion of the container extends below the aerial vehicle when engaged, the exposed portion of the container may have a curved shape.

The propellers 603 and corresponding propeller motors, or other form of propulsion, generally referred to herein as propulsion mechanisms, are positioned at both ends of each rigid member 605. The propeller motors may be any form of motor capable of generating enough speed with the propellers to lift the aerial vehicle 600 and any engaged inventory, thereby enabling aerial transport of the inventory.

Extending outward from each rigid member is a support arm 606 that is connected to a safety barrier 608. In this example, the safety barrier is positioned around and attached to the aerial vehicle 600 in such a manner that the motors and propellers 603 are within the perimeter of the safety barrier 608. The safety barrier may be plastic, rubber, etc. Likewise, depending on the length of the support arms 606 and/or the length, number or positioning of the rigid members 605, the safety barrier may be round, oval, or any other shape.

Mounted to the frame 604 is the aerial vehicle control system 610. In this example, the aerial vehicle control system 610 is mounted in the middle and on top of the frame 604. The aerial vehicle control system 610 controls the operation, routing, navigation, communication and the inventory engagement mechanism of the aerial vehicle 600.

Likewise, the aerial vehicle 600 includes one or more power modules 612. In this example, the aerial vehicle 600 includes power modules 612 that are removably mounted to the frame 604 and configured to provide power to components of the aerial vehicle control system and/or other components of the aerial vehicle. In addition, the independent device boards 602-1, 602-2, and 602-3, which are part of the aerial vehicle control system 610 but illustrated herein for discussion purposes, may also each be coupled to independent power supplies 612-1, 612-2, and 612-3, respectively. By individually powering each device board, a power failure of one power supply will not affect the power provided to the other device boards 602. For example, if power supply 612-1 fails it will render device board 602-1 inoperable but will not impact the operation of device boards 602-2 or 602-3.

The power module(s) for the aerial vehicle may be in the form of battery power, solar power, gas power, super capacitor, fuel cell, alternative power generation source, or a combination thereof. For example, the power modules 612 may each be Lithium Polymer (lipo) batteries.

In some implementations, one or more of the power modules may be configured such that it can be autonomously removed and/or replaced with another power module while the aerial vehicle is landed.

As mentioned above, the aerial vehicle 600 also includes an inventory engagement mechanism 614. The inventory engagement mechanism may be configured to engage and disengage items and/or containers that hold items. In this example, the inventory engagement mechanism 614 is positioned within a cavity of the frame 604 that is formed by the intersections of the rigid members 605. In this example, the inventory engagement mechanism is positioned beneath the aerial vehicle control system 610. In implementations with additional rigid members, the aerial vehicle may include additional inventory engagement mechanisms and/or the inventory engagement mechanism 614 may be positioned in a different cavity within the frame 604. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the aerial vehicle control system 610.

While the implementations of the aerial vehicle discussed herein utilize propellers to achieve and maintain flight, in other implementations, the aerial vehicle may be configured in other manners. For example, the aerial vehicle may include fixed wings and/or a combination of both propellers and fixed wings. For example, the aerial vehicle may utilize one or more propellers to enable takeoff and landing and a fixed wing configuration or a combination wing and propeller configuration to sustain flight while the aerial vehicle is airborne.

Figure 7:
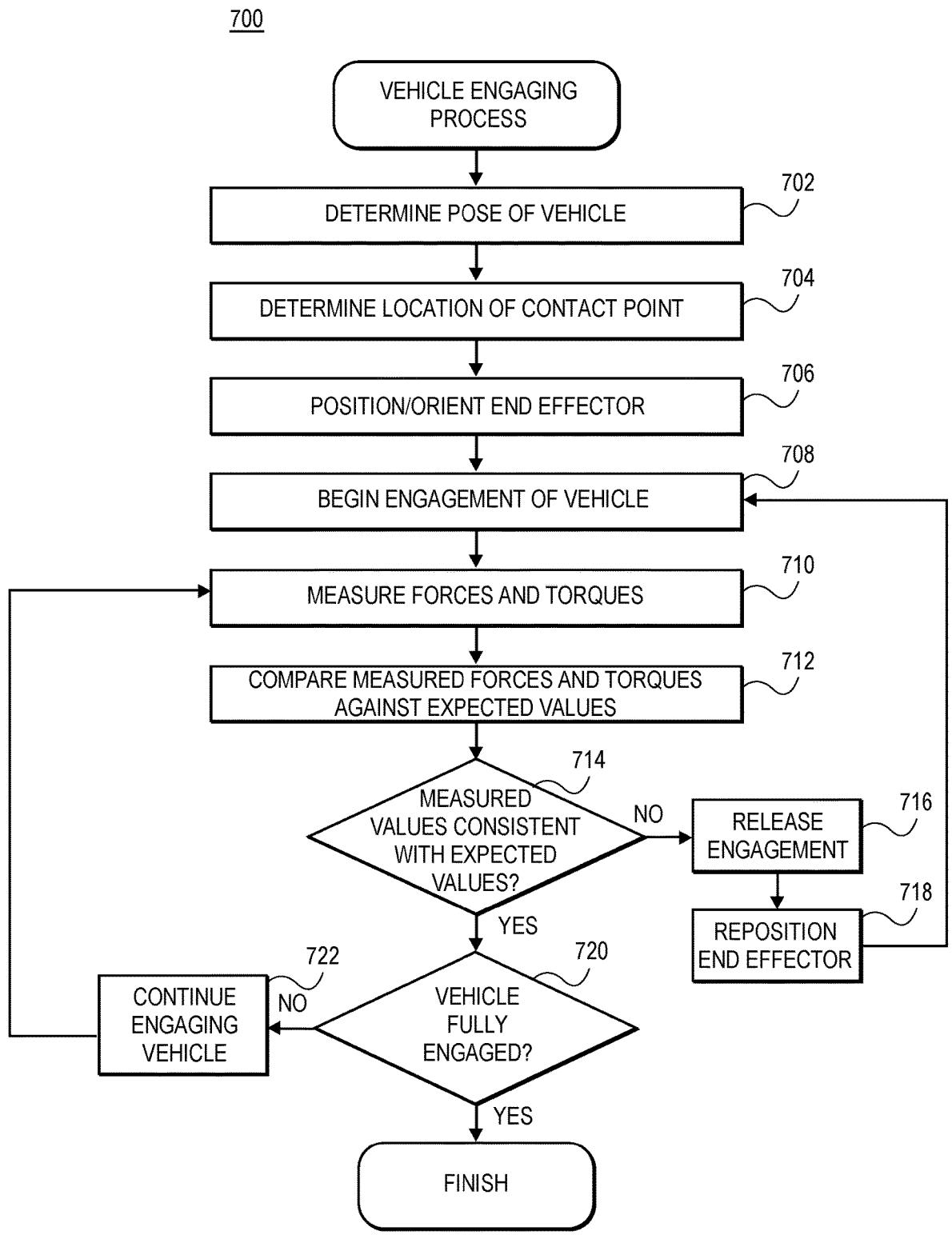
FIG. 7 is a flow diagram of an exemplary vehicle engaging process, in accordance with embodiments of the present disclosure.

FIG. 7 is a flow diagram of an exemplary process 700 for engaging an aerial vehicle (e.g., aerial vehicle 160) with an end effector (e.g., end effector 144), according to embodiments of the present disclosure. Process 700 can be performed by, for example, robot 110 with end-of-arm tool 140, which can include load cell 142 and end effector 144. As shown in FIG. 7, in steps 702 and 704, the location, position, and pose of the vehicle, as well as its contact point, to be engaged by an end effector of a robot, are determined. This can be performed, for example, using information obtained by proximity sensors and/or laser ranging sensors. Based on the determination of the location, position, and pose of the vehicle and the vehicle's contact point, the end effector can be positioned and oriented to engage the contact point of the vehicle, as in step 706. After the end effector has been positioned, the end effector can initiate engagement of the vehicle (e.g., arms of end effector 144 can begin to be articulated from an open position to a closed position), as shown in step 708. In step 710, as the end effector is being articulated into a closed position, the forces and torques exerted on the end effector by the vehicle can be measured. This can be performed, for example, by load cell 142. The measured forces and torques can be compared against expected values of the forces and torques, as in steps 712 and 714. The expected values can vary for different vehicle types. Accordingly, in determining the expected values, a vehicle type of the vehicle to be engaged can first be determined. For example, the measurement of the forces and torques and comparison with expected values during the engagement process can indicate whether the engagement of the vehicle is proper (e.g., correct alignment, etc.). Alternatively and/or in addition, the measurement of the forces and torques and comparison with expected values during the engagement process can indicate certain fault conditions associated with the vehicle (e.g., stability of the vehicle, etc.). If the values are consistent with what is expected (e.g., within an acceptable tolerance range), it is determined, in step 720, whether the vehicle is fully engaged, and, if not, in step 722, the end effector can continue to engage the vehicle (e.g., articulate to a closed position) to fully engage the vehicle. As shown in FIG. 7, as the end effector continues to close, the forces and torques exerted on the end effector are continuously measured and compared against expected values.

In the event that the measured values are inconsistent with the expected values, the engagement of the vehicle is released (e.g., the end effector is articulated to an open position to fully release the vehicle), as in step 716, and the end effector is repositioned in step 718. The repositioning of the end effector can be performed based on information received from proximity sensors and/or laser ranging sensors, as well as the measured forces and torques. After the end effector has been repositioned, the process of engaging the vehicle, measuring the forces and torques exerted on the end effector, and comparing the measured values against expected values is repeated. The measurement of forces and torques exerted on the end effector and the comparison of these measured values against expected values can be repeated until the end effector is fully closed so as to fully engage the vehicle.

Figure 8:
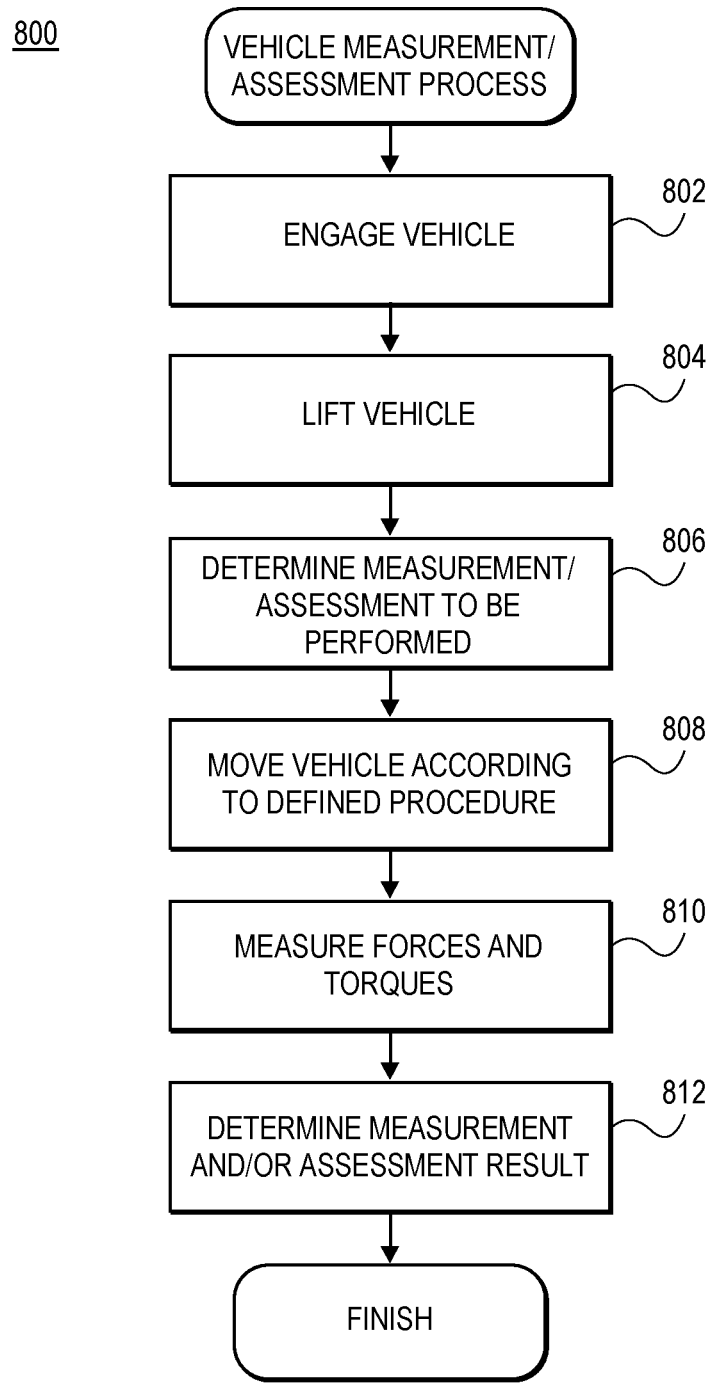
FIG. 8 is a flow diagram of an exemplary process for performing vehicle measurements or assessments, in accordance with embodiments of the present disclosure.

FIG. 8 is a flow diagram of an exemplary process 800 for measuring or assessing a vehicle engaged with a robot. Process 800 can be performed by, for example, robot 110 with end-of-arm tool 140, which can include load cell 142 and end effector 144, after it has engaged an aerial vehicle with an end effector. As shown in FIG. 8, in step 802, the aerial vehicle is engaged. This can be performed, for example, using the process shown and described in connection with FIG. 7. After the vehicle has been engaged (e.g., by an end effector), it is lifted off the ground, as in step 804. Next, the measurement or assessment associated with the vehicle to performed can be determined, in step 806. For example, measurement or assessment can include a measurement of inertial properties or parameters associated with the vehicle (e.g., mass, weight, center of gravity, moment of inertia, etc.) or a diagnostic test associated with the vehicle (e.g., whether a payload was delivered, whether the vehicle sustained damage, etc.). After the measurement or assessment to be performed has been determined, the vehicle can be moved and manipulated in accordance with the predetermined protocol or procedure of sequenced movements to obtain the desired measurement or assessment, as in step 808. As the robot is moving and/or manipulating the vehicle through the defined procedure, forces and torques exerted by the vehicle on the end effector can be measured (e.g., by a load cell), as in step 810. These measurements can be utilized to determine the desired inertial properties or parameters associated with the vehicle, parameters associated with a payload of the vehicle, and/or provide an assessment of the vehicle and identification of certain fault conditions, as in step 812. For example, in one such exemplary procedure, the robot can rotate the engaged aerial vehicle about the x-axis a certain angle (e.g., 5 degrees, 10 degrees, 15 degrees, 45 degrees, 90 degrees, 180 degrees, 360 degrees, etc.). Alternatively and/or in addition, the robot can translate the engaged aerial vehicle along the x-axis a certain distance (e.g., ±1 meter, ±2 meters, ±5 meters, etc.). These measurements can be compared against expected values for the engaged aerial vehicle, as in step 810. The expected values can vary for different vehicle types. Accordingly, in determining the expected values, a vehicle type of the engaged vehicle can first be determined. If the values are consistent with what is expected (e.g., within an acceptable tolerance range), the vehicle can be then rotated about the y-axis. For example, the robot can rotate the engaged aerial vehicle about the y-axis a certain angle (e.g., 5 degrees, 10 degrees, 15 degrees, 45 degrees, 90 degrees, 180 degrees, 360 degrees, etc.). Alternatively and/or in addition, the robot can translate the engaged aerial vehicle along the y-axis a certain distance (e.g., ±1 meter, ±2 meters, ±5 meters, etc.). Optionally, the measurements and/or assessments performed in connection with a specific vehicle can be stored so as to create a historical profile that can provide further insights and diagnostic information associated with the vehicle. For example, changes in the recorded values over time can provide diagnostic information in connection with the vehicle and determination of faults (e.g., wearing down of certain components, etc.).

Figure 9:
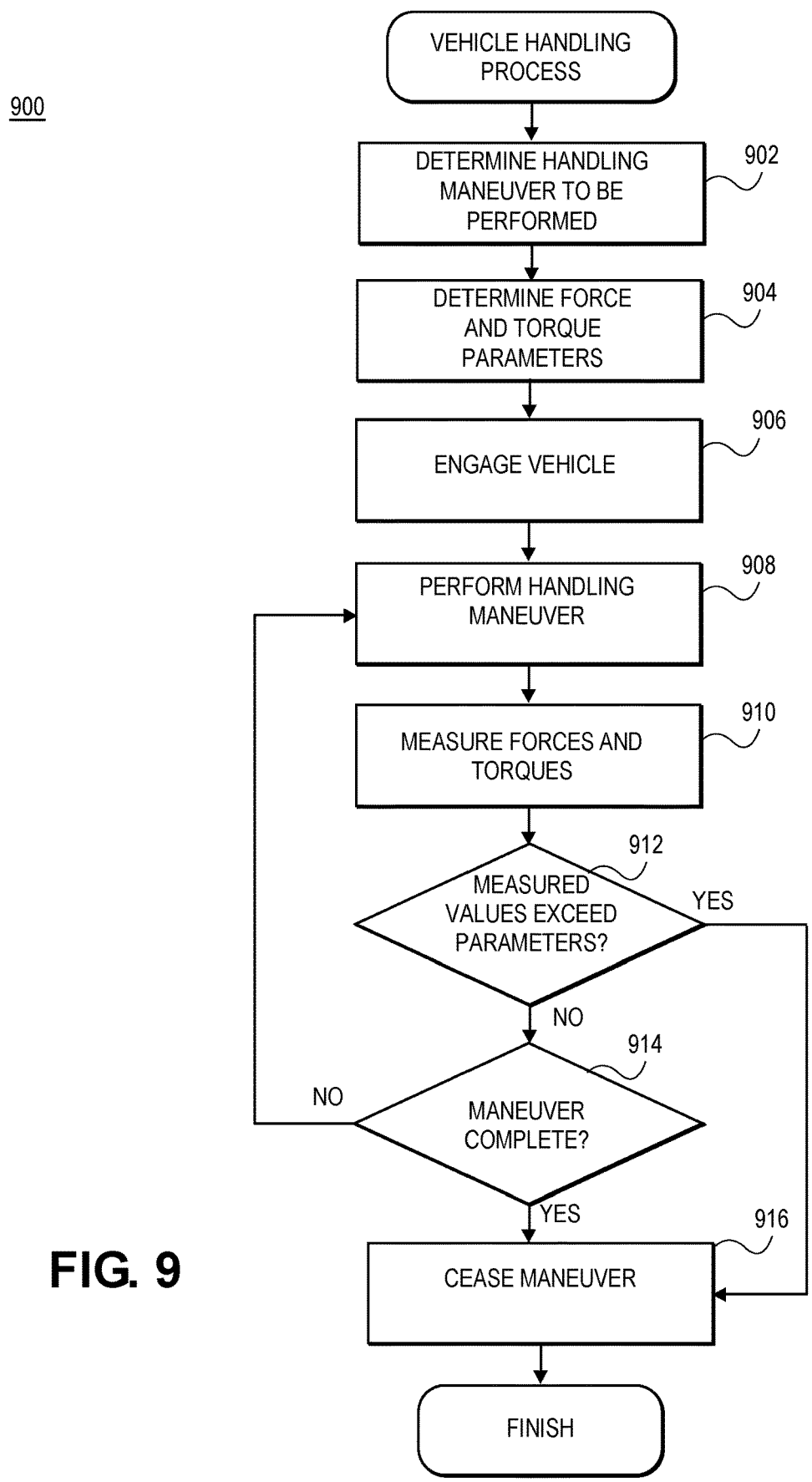
FIG. 9 is a flow diagram of an exemplary vehicle handling process, in accordance with embodiments of the present disclosure.

FIG. 9 is a flow diagram of an exemplary vehicle handling process 900 according to embodiments of the present disclosure. Process 900 can be one specific exemplary implementation of process 800 and can be performed by, for example, robot 110 with end-of-arm tool 140, which can include load cell 142 and end effector 144, after it has engaged an aerial vehicle with an end effector. As shown in FIG. 9, in step 902, the handling maneuver to be performed can be determined. This can include, for example, where a vehicle is to be transported, how it is to be manipulated, if any specific procedure is to be performed, etc. In step 904, the force and torque parameters associated with the handling maneuver to be performed can be determined. This can include, for example, the maximum allowable forces and torques that should be exerted on the vehicle in performing the prescribed maneuver. Accordingly, the parameters can vary depending on the vehicle and/or the maneuver being performed. Next, the vehicle can be engaged in step 906. This can be performed, for example, using the process shown and described in connection with FIG. 7. In step 908, the handling maneuver can be initiated. As the robot is handling the vehicle, forces and torques exerted by the vehicle on the end effector can be measured (e.g., by a load cell), as in step 910. These measurements can be compared against the force and torque parameters associated with the maneuver and/or the engaged vehicle (step 912). Assuming that the measured values do not exceed the parameters, the maneuver is continued (step 914) until the maneuver is complete (916). In the event that any of the measured values exceed the parameters associated with the maneuver and/or the aerial vehicle, the maneuver can be immediately ceased.

Figure 10:
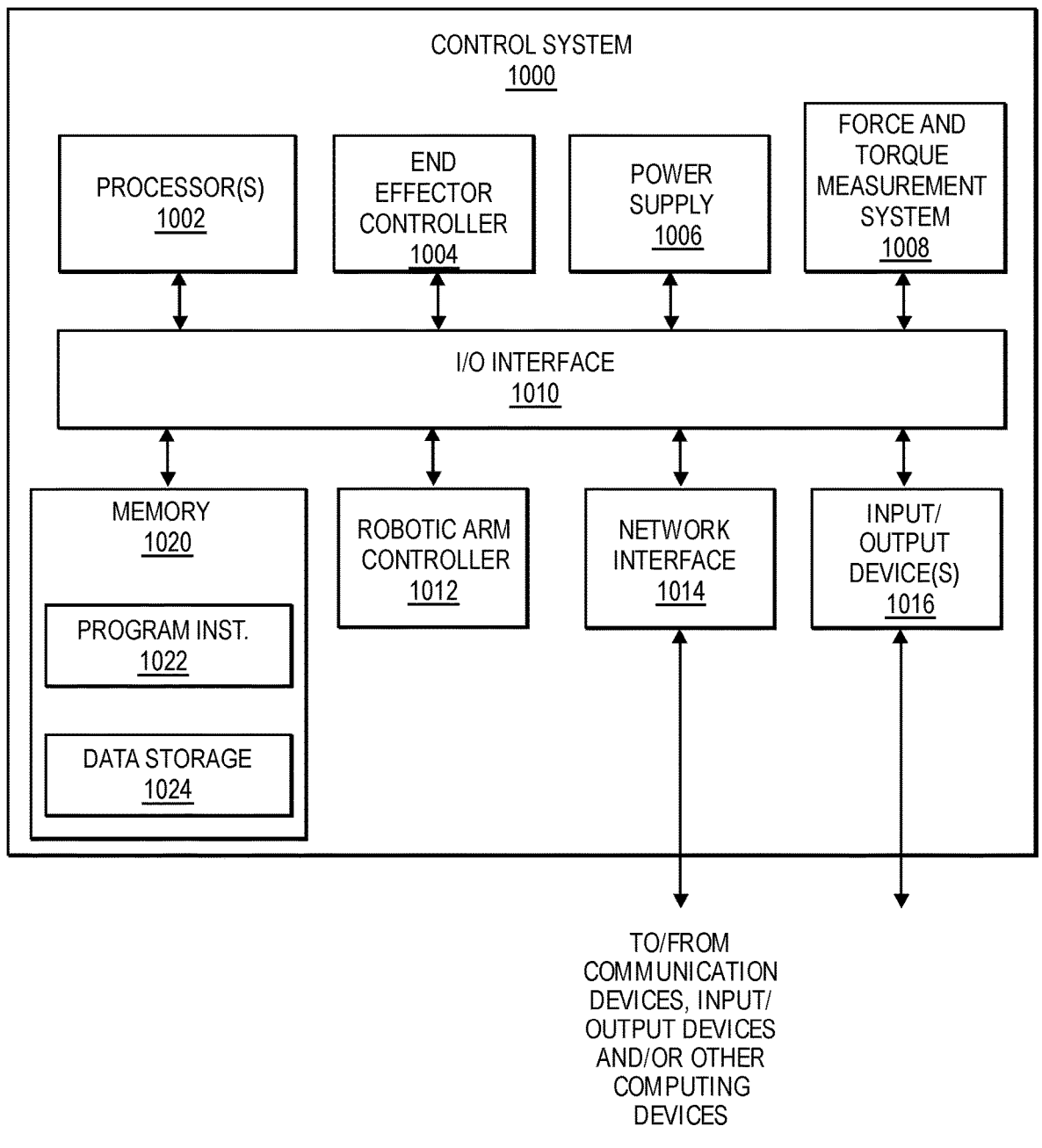
FIG. 10 is an exemplary control system, in accordance with embodiments of the present disclosure.

FIG. 10 is a block diagram illustrating various components of an exemplary robot control system 1000, in accordance with embodiments of the present disclosure.

In various examples, the block diagram may be illustrative of one or more aspects of the robot control system 1000 that may be used to implement the various systems and methods discussed herein and/or to control operation of a robot discussed herein. In the illustrated implementation, the robot control system 1000 includes one or more processors 1002, coupled to a memory, e.g., a non-transitory computer readable storage medium 1020, via an input/output (I/O) interface 1010. The robot control system 1000 also includes end effector controllers 1004, such as motor controllers, power modules 1006, force and torque measurement system 1008, and/or robotic arm controller 1012. The robot control system 1000 further includes a network interface 1014, and one or more input/output devices 1016.

In various implementations, the robot control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, manipulation instructions, predetermined protocols and/or sequenced movements, aerial vehicle types, and/or data items accessible by the processor(s) 1002. In various implementations, the non-transitory computer readable storage medium 1020 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022 and data storage 1024, respectively. In other implementations, program instructions, data, and/or flight controls may be received, sent, or stored upon different types of computer-accessible media, such as non-transitory media, or on similar media separate from the non-transitory computer readable storage medium 1020 or the robot control system 1000. Generally speaking, a non-transitory, computer readable storage medium may include storage media or memory media such as magnetic or optical media, e.g., disk or CD/DVD-ROM, coupled to the robot control system 1000 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1014.

In one embodiment, the I/O interface 1010 may be configured to coordinate I/O traffic between the processor(s) 1002, the non-transitory computer readable storage medium 1020, and any peripheral devices, the network interface or other peripheral interfaces, such as input/output devices 1016. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The end effector controller 1004 and robotic arm controller 1012 may communicate with the robot to adjust the manipulation, orientation, or other parameters of the pivots and/or motors to facilitate operation of the robot.

The end effector controller 1004 and robotic arm controller 1012 may include sensors that can be used to manipulate, orient, and position the robotic arm and/or the end effector. The end effector controller 1004 and robotic arm controller 1012 can communicate with the actuator(s) or motor(s) (e.g., a servo motor) used to manipulate, engage, and/or disengage aerial vehicles.

The network interface 1014 may be configured to allow data to be exchanged between the robot control system 1000, other devices attached to a network, such as other computer systems (e.g., remote computing resources), and/or with aerial vehicle control systems of other aerial vehicles. For example, the network interface 1014 may enable wireless communication between the aerial vehicle and an aerial vehicle control system that is implemented on one or more remote computing resources. For wireless communication, an antenna of the aerial vehicle or other communication components may be utilized. As another example, the network interface 1014 may enable wireless communication between numerous aerial vehicles. In various implementations, the network interface 1014 may support communication via wireless general data networks, such as a Wi-Fi network. For example, the network interface 1014 may support communication via telecommunications networks, such as cellular communication networks, satellite networks, and the like.

Input/output devices 1016 may, in some implementations, include one or more displays, imaging sensors (e.g., cameras), speed sensors, force and torque detectors, laser sensors (e.g., LIDAR), thermal sensors, radar, thermal sensors, accelerometers, gyroscopes, RFID sensors, etc. Multiple input/output devices 1016 may be present and controlled by the robot control system 1000. One or more of these sensors may be utilized to implement the implementations described.

As shown in FIG. 10, the memory may include program instructions 1022, which may be configured to implement the example routines and/or sub-routines described herein. The data storage 1024 may include various data stores for maintaining data items that may be provided for robot navigation, determining routing of the robot, locating aerial vehicle locations, locating aerial vehicle handling locations, detecting objects or object types, determining track layout, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the robot control system 1000 is merely illustrative and is not intended to limit the scope of the present disclosure. In particular, the computing system and devices may include any combination of hardware or software that can perform the indicated functions. The robot control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated robot control system 1000. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the robot control system 1000 may be transmitted to the robot control system 1000 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other robot control system configurations.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7-10, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two.

A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
    a robot including:
        a robotic arm;
        an end effector coupled to the robotic arm and including a first engagement element configured to engage a contact point of an aerial vehicle, the end effector not having any sensors that contact the aerial vehicle; and
        a six-degree of freedom load cell rigidly coupled to the end effector and configured to measure at least one of a force or a torque exerted on the end effector; and
    a control system including one or more processors and program instructions that, when executed by the one or more processors, cause the one or more processors to at least:
        determine a location and orientation of the contact point of the aerial vehicle;
        position the end effector to engage the contact point of the aerial vehicle;
        cause the end effector to initiate engagement of the contact point of the aerial vehicle;
        measure, using the six-degree of freedom load cell, at least one of an applied force or an applied torque exerted on the end effector as the end effector is engaging the aerial vehicle;
        determine that an alignment of the end effector with the contact point is incorrect based at least in part on at least one of the applied force or the applied torque;
        release the end effector from the contact point;
        reposition the end effector based at least in part on at least one of the force or the torque; and
        re-initiate engagement of the contact point of the aerial vehicle with the end effector.

2. The system of claim 1, wherein the control system includes a data store, and at least one of the applied force or the applied torque measured in connection with the aerial vehicle is stored to create a profile associated with the aerial vehicle.

3. The system of claim 1, wherein the six-degree of freedom load cell is disposed at a wrist of the robotic arm.

4. The system of claim 1, wherein the first engagement element includes an expandable bar that expands when engaged with the contact point of the aerial vehicle.

5. The system of claim 1, wherein the end effector further includes:
    a first arm and a second arm, the first engagement element coupled to the first arm and a second engagement element coupled to the second arm.

6. An engagement apparatus, comprising:
    an end effector configured to be coupled to a robotic apparatus and to engage a vehicle, the end effector not having any sensors that are configured to contact the vehicle; and
    a load cell rigidly coupled to the end effector and configured to measure at least one of a force or a torque exerted on the end effector,
    wherein the load cell measures at least one of the force or the torque exerted on the end effector as the end effector is engaging the vehicle to determine that an alignment of the end effector with a contact point of the vehicle is incorrect and the end effector:
        releases the vehicle;
        is repositioned based at least in part on at least one of the measured force or the measured torque; and
        re-initiates engagement with the vehicle at the contact point.

7. The engagement apparatus of claim 6, wherein the end effector engages the vehicle at a contact point on the vehicle.

8. The engagement apparatus of claim 7, wherein the contact point on the vehicle includes a cavity.

9. The engagement apparatus of claim 6, wherein the load cell is configured to measure at least one of the force or the torque as the vehicle is manipulated through a predetermined sequence to, at least one of:
    obtain an inertial parameter associated with the vehicle;
    determine a fault condition associated with the vehicle; or
    determine a payload parameter associated with the vehicle.

10. The engagement apparatus of claim 9, wherein the inertial parameter includes at least one of:
    a center of gravity;
    a moment of inertia;
    a mass; or
    a vibration response.

11. The engagement apparatus of claim 6, wherein the load cell is configured to provide force and torque measurements in six degrees of freedom of movement.

12. The engagement apparatus of claim 6, wherein the end effector includes a first arm and a second arm, the first arm and the second arm being configured to be articulated between an open position and a closed position.

13. The engagement apparatus of claim 12, wherein the first arm is fixed and the second arm is movable between the open position and the closed position.

14. The engagement apparatus of claim 6, wherein the load cell is configured to measure at least one of the force or the torque as the end effector is engaging the vehicle to determine proper engagement of the vehicle.

15. The engagement apparatus of claim 6, further comprising a second load cell configured to be coupled to the robotic apparatus, the second load cell being configured to measure at least one of a second force or a second torque exerted on the robotic arm.

16. A computer-implemented method, comprising:
    determining a location and orientation of a contact point of a vehicle;
    positioning an end effector of a robotic arm to engage the contact point of the vehicle;
    causing the end effector to initiate engagement of the contact point of the vehicle;
    measuring at least one of a force or a torque exerted on the end effector as the end effector is engaging the contact point of the vehicle;
    determining an alignment of the end effector with the contact point based at least in part on at least one of the force or the torque;
    engaging the contact point with the end effector based at least in part on the alignment determining that the alignment is incorrect based at least in part on at least one of the measured force or the measured torque;
    releasing the end effector from the contact point repositioning the end effector based at least in part on at least one of the force or the torque; and
    closing the repositioned end effector so as to begin engagement of the contact point of the vehicle with the end effector.

17. The computer-implemented method of claim 16, further comprising:
    subsequent to engaging the contact point with the end effector:
    lifting the vehicle;
    moving the vehicle in a predetermined sequence; and
    measuring at least one of a second force or a second torque while moving the vehicle in the predetermined sequence to determine at least one of an inertial parameter associated with the vehicle, a fault condition associated with the vehicle, or a payload parameter associated with the vehicle.

18. The computer-implemented method of claim 17, further comprising:
    determining a handling maneuver to be performed in connection with the vehicle;
    determining at least one of a force parameter or a torque parameter associated with at least one of the vehicle or the handling maneuver;
    initiating the handling maneuver;
    measuring at least one of a second force or a second torque exerted on the end effector while the handling maneuver is being performed; and
    comparing at least one of:
    the second force to the force parameter; or
    the second torque to the torque parameter.

* * * * *